United States Patent [19]
Brooks

[11] Patent Number: 5,050,843
[45] Date of Patent: Sep. 24, 1991

[54] PLUG VALVE WITH METAL-TO-METAL SEALING

[75] Inventor: Robert T. Brooks, Aberdeen, Scotland

[73] Assignee: Manifold Systems, Inc., Alice, Tex.

[21] Appl. No.: 567,738

[22] Filed: Aug. 15, 1990

[51] Int. Cl.⁵ .................... F16K 5/04; F16K 41/00
[52] U.S. Cl. .................... 251/214; 251/312; 277/112; 277/206 R; 277/236; 285/917
[58] Field of Search ............... 251/214, 309, 312, 316, 251/317, 314; 277/110, 112, 205, 206 R, 236; 285/917

[56] References Cited

U.S. PATENT DOCUMENTS

| | | | |
|---|---|---|---|
| 1,965,273 | 7/1934 | Wilson | 285/917 |
| 2,211,983 | 8/1940 | Parris | 285/917 |
| 2,641,381 | 6/1953 | Bertrand | 277/205 |
| 2,954,961 | 10/1960 | Stogner et al. | 251/316 |
| 3,047,301 | 7/1962 | Taylor et al. | 285/917 |
| 3,080,171 | 3/1963 | Booth | 277/236 |
| 3,133,722 | 5/1964 | McQuire et al. | 251/309 |
| 3,207,524 | 9/1965 | Trbovick | 285/917 |
| 3,398,763 | 8/1968 | Richards | 251/188 X |
| 3,567,258 | 3/1971 | Scaramucci | 277/236 |
| 3,637,223 | 1/1972 | Weber | 277/236 |
| 3,759,552 | 9/1973 | Levinsohn et al. | 285/917 |
| 3,765,645 | 10/1973 | Paul, Jr. | 251/188 X |
| 4,133,557 | 1/1979 | Ahlstone | 285/39 |
| 4,133,558 | 1/1979 | Ahlstone | 285/39 |
| 4,153,281 | 5/1979 | Ahlstone | 285/167 |
| 4,168,852 | 9/1979 | Ahlstone | 285/336 |
| 4,168,853 | 9/1979 | Ahlstone | 285/336 |
| 4,221,408 | 9/1980 | Lochte et al. | 285/276 |
| 4,506,696 | 3/1985 | von Pechmann | 251/309 |
| 4,626,003 | 12/1986 | Williams et al. | 285/98 |
| 4,695,078 | 9/1987 | Anderson | 285/98 |
| 4,810,010 | 3/1989 | Jones | 285/55 |

FOREIGN PATENT DOCUMENTS

| | | |
|---|---|---|
| 0029782 | of 1981 | European Pat. Off. . |
| 008181 | 2/1983 | European Pat. Off. . |
| 8303883 | 11/1983 | European Pat. Off. . |
| 0124304 | 11/1984 | European Pat. Off. . |
| 0161165 | 11/1985 | European Pat. Off. . |
| 0190063 | 8/1986 | European Pat. Off. . |
| 0250072 | 12/1987 | European Pat. Off. . |
| 0266092 | 5/1988 | European Pat. Off. . |
| 2418405 | of 1979 | France . |
| 2135402 | 8/1984 | United Kingdom . |
| 2135741 | 9/1984 | United Kingdom . |
| 2171771 | 9/1986 | United Kingdom . |
| 2180903 | 4/1987 | United Kingdom . |
| 2197395 | 5/1988 | United Kingdom . |

Primary Examiner—George L. Walton

[57] ABSTRACT

A plug valve with metal-to-metal annular sealing rings with a V shaped cross section to provide a resilient force for sealingly engage with respect to a horizontal sealing surface and a nearly vertical rotatable sealing surface and/or with a vertical sealing surface.

12 Claims, 4 Drawing Sheets

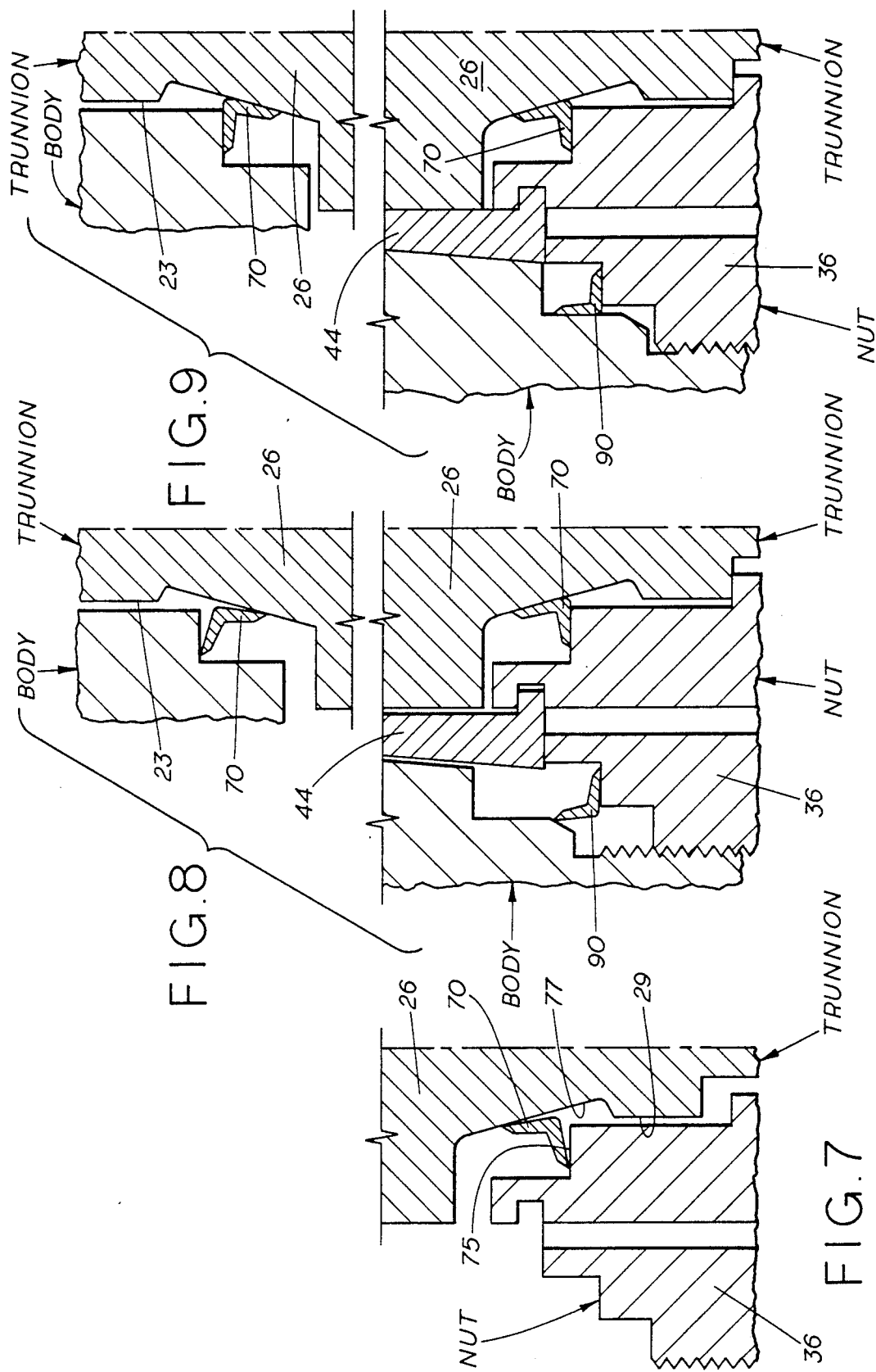

PLUG VALVE WITH METAL-TO-METAL SEALING

RELATED APPLICATION

This application is related to a co-pending application, S/N 89-05010, filed Nov. 8, 1989 and entitled: "High Pressure Pipe Coupling" and to a co-pending application, U.S. Ser. No. 567,737, filed Aug. 15, 1990 and entitled "Valve With Metal-to-Metal Sealing Means.

FIELD OF THE INVENTION

This invention relates to metal-to-metal sealing elements for use in sealing metal shafts, fluid cylinders and the like and which can be utilized with corrosive liquids and/or high temperatures and are capable of sealing under both static and dynamic conditions.

BACKGROUND OF THE INVENTION

Plug valves are standard available products which are designed for a number of applications. The particular invention of this application is involved with the metal sealing means for a heavy duty plug valve which is utilized in oil field operations.

Typically a plug valve includes a hollow valve body which contains a rotatable plug valve element where the plug valve element typically is rotatable through a 90° (¼ turn) for a rapid full open or closed operation. Typically, the pressure seals which are utilized to seal the trunnions and closures in a plug valve are made of elastomers such as a butadiene-styrene composition such as Hycar or a synthetic rubber such as VITON which are satisfactory for most applications. However, in some instances metal-to-metal seals would be preferable in a plug valve because of resistance to corrosive nature of fluids and resistance to temperature effects which causes deterioration of elastomer products. In the case of fire or excessive temperatures, elastomer seals in a valve can melt or soften to an extent that there is a leak and can create a fire hazard. Additionally, in a plug valve, the rotation of the trunnions relative to the seal tends to eventually wear out the seals.

Metal-to-metal seals have heretofore been employed in pipe couplings for interconnecting to flanges to one another. Current metal-to-metal seals in this type of use include the following.

(1) The API flange - this is a widely used coupling for high pressure fluids and involves a face-to-face coupling of flanges with an interposed metal sealing member between the flanges. The metal sealing member is usually a flat faced seal that is crushed between two flat faced hubs on the flanges.

(2) A "Grayloc" type connector - this connector is comprised of facing, metal seal ring, hubs and an annular clamp assembly and internal metal sealing ring resembling an inverted "T" in cross section disposed between the hubs. The clamp assembly fits over the outer annular surface of the two facing hubs and is forced radially inward by making up the clamp bolts to draw the facing hubs together and to compress with the sealing ring rib between the hub surfaces. As the hubs are drawn together by the clamp assembly, the internal seal ring lips engage and deflect against the inner sealing surfaces on the hubs. The deflection of the seal ring lips elastically preloads the lips of the seal ring against the inner sealing surfaces of the hubs thereby forming a preloaded seal. In use, internal pressure acts on the seal ring lips so that the sealing action of the lips is both preloaded and pressure-energized. However, if the internal pressure becomes sufficiently great to cause the facing hubs to be displaced or moved longitudinally of one another, the seal ring lips will lose their sealing ability because the preloading sealing compression between the hubs and the seal is lost. Also, the metal seal ring has a 20° (sometimes 25°) bevel so that the seal lips do not radially compensate for movement of the seal lips when the hubs are spread apart from one another.

(3) "Weco" wing union —this coupler has metal-to-metal compression seals disposed between connector surfaces and uses a lip type elastomer replaceable seal to protect the metal primary seal.

(44) A "dynetor" connector—this is a metal-to-metal connector coupling with a reusable annular metal seal. The annular metal seal has cylindrical ends so that some longitudinal expansion or spreading between the coupling parts can occur without losing the seal in the annular seal bores.

(5) The Nicholson flange—this is an annular shaped gasket which is used between flanges and flange grooves. The flange seal, when compressed between flanges, will expand with longitudinal movement but the seal will fail because the gasket expands longitudinally and thus will fail at the gap.

(6) The Nicholson flange—this is a seal which depends upon point contact for sealing and is a round seal.

(7) The Cameron AX or CX gasket illustrated in the 1990-91 Composite Catalog, pg 696. The AX and CX gasket is a tubular member which has an external taper on each end and sealing means which engage tapered surfaces in adjoining connectors.

PATENT ART

Prior patent art includes:
U.S. Pat. No. 2,863,679 issued Dec. 9, 1958;
U.S. Pat. No. 3,628,812 issued Dec. 21, 1971; and
U.S. Pat. No. 4,221,408 issued Sept. 9, 1980.

THE PRESENT INVENTION

The present invention is embodied in a plug valve where a pressure seal is required between circular cylindrical surfaces such as between the rotative trunnions of a valve element and the trunnion-receiving bores in a valve body. In the present invention, the seal means utilizes a tapered surface provided on the plug or valve stem and utilizes a transverse face in a sealing pocket to initially receive a metal seal ring in an unloaded condition. The seal ring is annular and "V" shaped in cross section. The seal ring is not symmetrical because the outer contact surface of the transverse flank or wing of the seal ring is at a 3° to 5° offset with respect to a transverse mating seal surface on the sealing pocket while the outer contact surface of the vertical flank or wing of the seal ring is at a 12° to 10° offset with respect to a vertical. The tapered surfaces on the plug stem are at an angle of 15° to provide an offset angle to the vertical flank of 3° to 5°. When the plug stem and an adjusting nut are interconnected, the edges of the seal ring contact the tapered surface on the plug stem and the transverse sealing surface so that the seal ring is compressed. In this condition, the seal ring is said to be loaded or prestressed because the wings of the seal ring exert a sealing pressure on the contact surfaces. After assembling an adjustment nut and the plug element, the other plug stem (or trunnion) is inserted through a body opening while the adjustment nut closes off the valve body cavity. A similar seal ring is utilized to seal off the other plug stem in the valve body.

Internal pressure in the valve body will act on the seal rings to further energize the seal faces of a seal ring to both the plug stem and the transverse sealing face in the seal pocket. When the plug valve element is "closed" a plug element "floats" or shifts laterally in response to pressure on the plug valve element. In the present design of the metal seal ring, the metal seal rings and plug can shift or move in the direction of sealing because the seal rings are free to move radially along the transverse faces of the seal pockets. Additionally, even with a shift, the sealing force of the seal is not changed or interfered with during or after the movement of plug element.

In eliminating existing elastomeric O-ring seals in a valve body element where the O-rings are between an adjusting nut and the valve body, the sealing faces of between the adjusting nut and the valve body are disposed essentially at 90° to each other and an existing bore on the valve body is utilized as a vertical face for sealing. The seal ring is profiled and is symmetrical so that in the unloaded (prior to insulation) condition, the seal flanks or wings make a 5° offset with respect to each of the cooperating seal surfaces. The outer radial edge of a seal ring is compressed radially inwards by pushing the seal ring into an entry bevel on a sealing surface and then into the vertical seal surface. The seal face on the adjusting nut is energized by screwing the nut into the valve body and pushing the seal ring ahead of it at the same time. This is a primarily static seal. Internal pressure will act on the seal ring to further energize the seal to the two seal surfaces.

DESCRIPTION OF THE DRAWINGS

FIG. 7 is a view in partial cross section of the application of the rotative seal ring of FIG. 2 between a plug valve element and an adjustment nut;

FIG. 8 is a view in partial cross section of the application of the seal ring of FIG. 2 between the upper trunnion of a valve element and a valve body as well as the application of a static seal ring in their initial conditions;

FIG. 9 is a view in partial cross section similar to FIG. 8 but showing the seal rings in a sealing condition;

DESCRIPTION OF THE INVENTION

Figure 1:
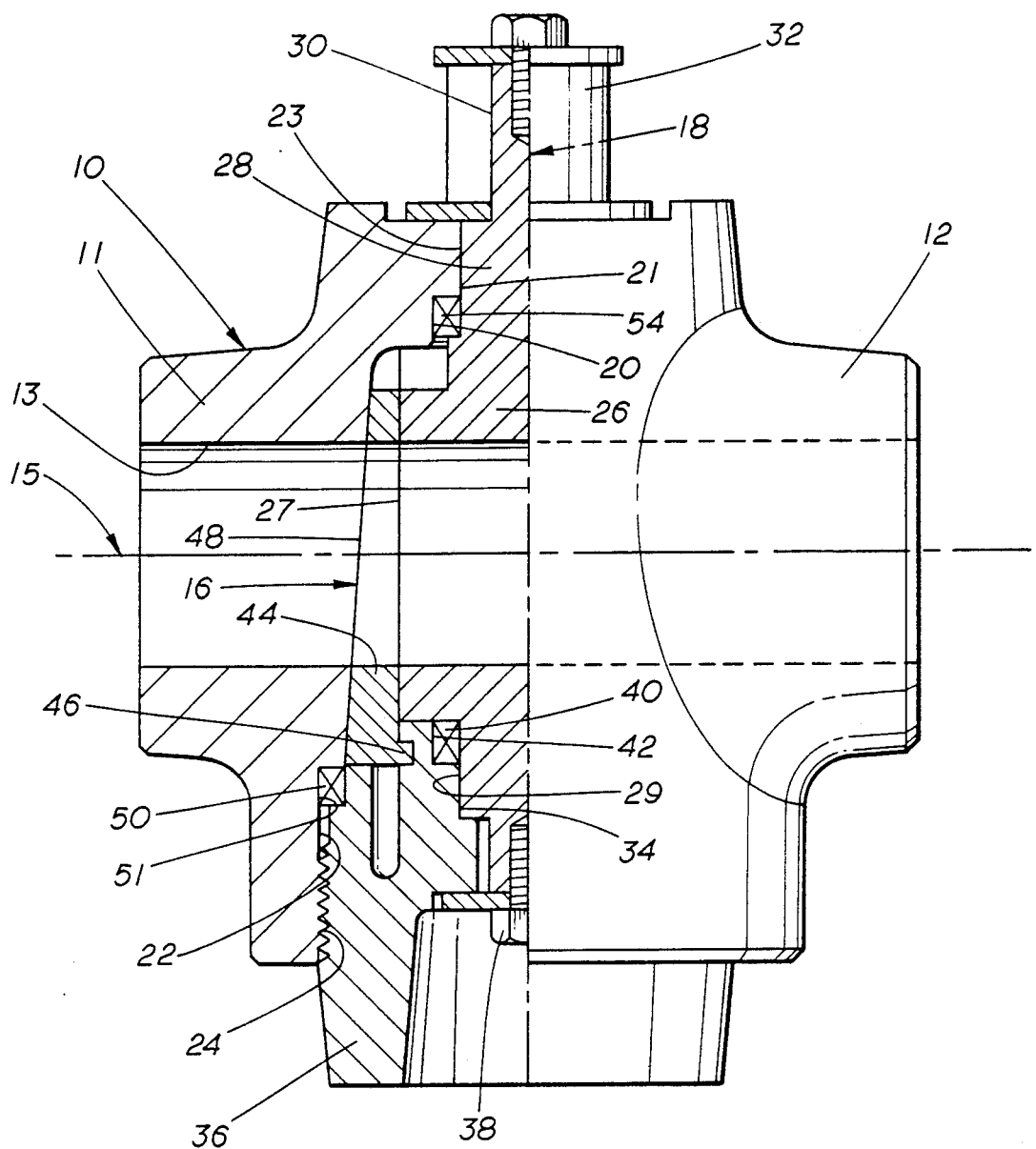
FIG. 1 is a view in partial longitudinal cross section of a prior art plug valve.

Referring now to FIG. 1, a prior art plug valve is illustrated for a background understanding of the invention as well as an understanding of the application of the present invention. The plug valve of FIG. 1 includes a valve body 10 constructed from alloy steel which will resist abrasion and corrosion. The valve body has side located flow inlet connections 11 and 12 which can be flanged, threaded, clamp type or union type as may be desired for connections to a pipe. The inlet connections 11 and 12 have an inlet or flow passages 13 (only one shown) which are in alignment with one another along a central axis 15. In the body of the plug valve is a transverse chamber 17 which includes a frusto conical or tapered wall surface 16 which is disposed about a vertical axis 18. The tapered wall surface 16 terminates in the upper part of the valve body above the passages 13 with an annular sealing recess 20 and a bore 21 for the upper valve stem or trunnion 23. The lower portion of the chamber in the valve body located below the passages 13 has a cylindrically shaped wall 22 which adjoins a lower internal thread 24.

A plug or valve element 26 is symmetrically arranged with respect to a central vertical axis which coincides with the vertical axis 18 of the valve body. The valve element 27 is provided with an upper trunnion portion 28 and a lower trunnion portion 29. The upper trunnion portion 28 has a post member 30 with a hexagonal outer shape which extends coaxially therefrom and is slidably received in a hexagonal bore in a handle adapter 32. The lower trunnion 29 of the valve element 26 is rotationally mounted in a bore 34 in the body of an adjustment nut 36 which is externally threaded for threaded connection with the threads 24 of the valve body 10. The lower trunnion 29 is attached to the adjustment nut 36 by a post and cap screw 38. An annular sealing element 40 is located in an annular sealing recess 42 in the nut 36. In valve operation, the sealing element 40 is subjected to rotational movement of the lower trunnion 29.

In assembly, the sealing element 40 is inserted into the the sealing recess 42 and the plug element 26 attached to the adjusting nut 36 by the post 29 and cap screw 38. Also disposed about the circumference of the central plug element 27 are two semicircular inserts 44 (only one shown). Each insert 44 is keyed by a lip portion 46 to an annular groove in the external surface of the adjusting nut. The inserts also are keyed against rotation relative to the valve body member 10 by vertical slots and lugs (not shown). The inserts 44 have a cylindrical inner surface and an outer frusto conical tapered surface 48. Thus, when the inserts are assembled on the adjustment nut 36, and the plug valve element 26, the subassembly is inserted into the valve body chamber 17 so that the upper trunnion 28 passes through the bore 21. The adjustment nut 36 will adjust the vertical "play" of the plug element 26 and inserts 44 in the valve body to align the bores 26 and 44 with the passage 13 in the valve body. When the adjustment nut is in the valve body, the upper trunnion 28 extends outwardly of the valve body and is rotationally attached to the valve body by a cap screw device. In the assembly, an annular static seal member 50 is disposed in a sealing recess 51 located between the adjusting nut 36 and the valve body 10. At the upper trunnion 28, a rotatable sealing element 54 is received in the sealing recess 54a. The plug element 26 and the inserts 44 have bores which align with the inlet passage 13 in an open position. When the plug element is rotated 90° or one-quarter turn from the position shown in FIG. 1, the blank cylindrical surface on the plug element closes off the passages 13. As can be appreciated, in a closed position of the valve element, pressure acts on the valve element 26 and moves or shifts the valve element 26 laterally onto an insert surface. The seals 54 and 40 prevent leakage from the space between the trunnions and the trunnion bores. These are dynamic seals because sealing pressure is applied as the trunnions are rotated. The seal 50 is a static seal which is located between the adjusting nut 36 and the valve body 10.

Heretofore the sealing means in a plug valve have been elastomer or plastic devices. In the present invention, as will hereinafter be described, metal sealing means have been provided to be utilized in a plug valve.

Figure 3:
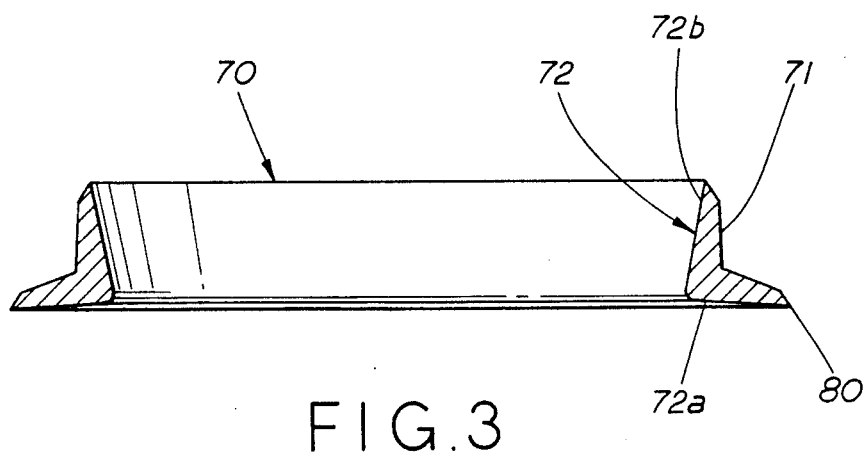
FIG. 3 is a view in partial cross section of the rotative seal ring shown in FIG. 2.
Figure 2:
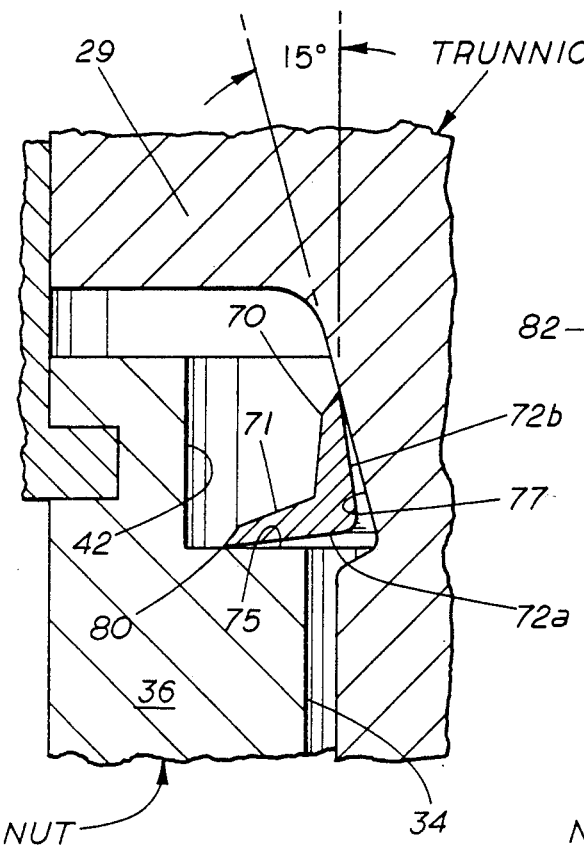
FIG. 2 is a view in partial cross section of a rotative seal ring in initial unsealing condition.

Referring now to FIG. 2, a portion of the valve element trunnion 29 and the valve body 10 are illustrated in a fragmentary enlarged view to illustrate a resilient metal sealing ring or sealing means 70 in position for an initial installation. The sealing means 70 as shown in FIG. 3, is an annular member which is "V" shaped in cross section with inner and outer surfaces 71, 72. As shown in FIG. 2, the sealing means 70 is intended to seal with respect to a transverse annular surface 75 of the adjusting nut 36 and a vertical frusto conical trunnion surface 77 which is inclined at an angle of 15° relative to vertical so that the included angle between the sealing surfaces 75 and 77 is 75°. In an unconfined unstressed condition, the sealing means 70 has its outer surfaces 72a, 72b disposed at an included angle of approximately 85°. Thus, when the sealing means 70 is disposed in the sealing recess 42, the angle between the surfaces 72b, 77 and the surfaces 72a, 75 is approximately 3° for each angle. In the initial unstressed condition, the outer rim edge 80 of the sealing means 70 is displaced from the closed corner of the sealing groove 42.

Figure 10:
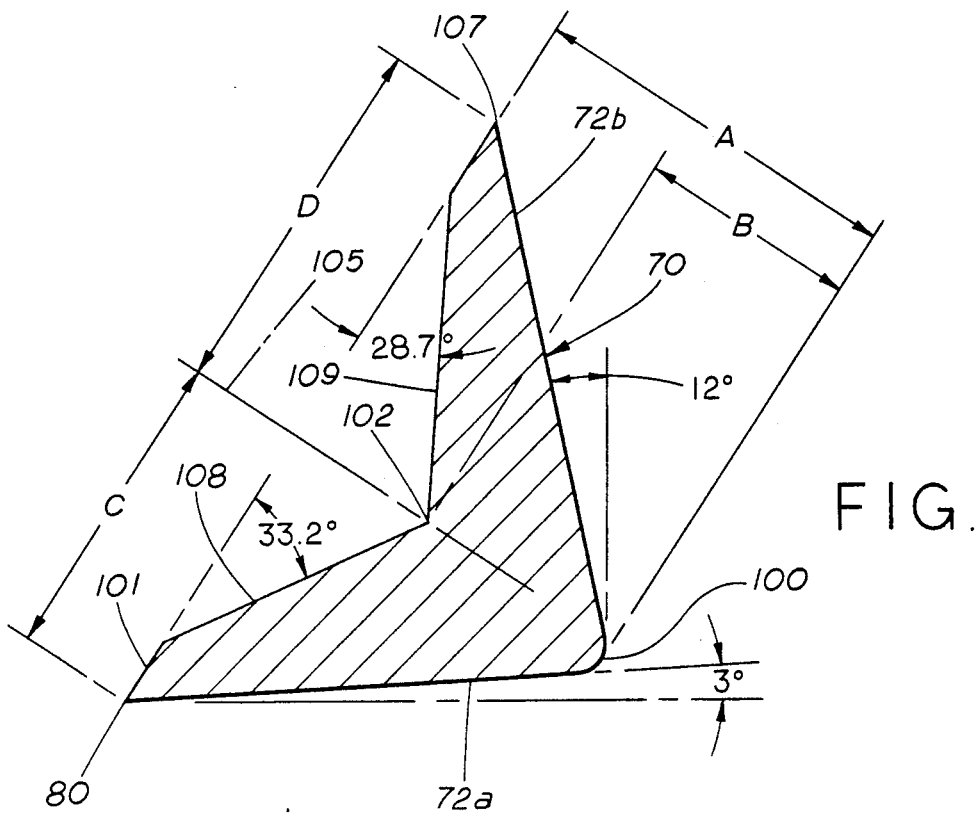
FIG. 10 is an enlarged view in cross section through a rotative seal ring as shown in FIG. 2.

As shown in FIG. 10, a typical seal ring for a 2' valve has the following dimension:

A = 0.176 inches where A is the vertical dimension from an apex point 100 to a base plane 101.

B = 0.110 inches where B is the vertical distance from the outer apex point 100 to an inner apex point 102.

C = 0.147 inches where C is the distance above the base plane 101 from a rim 80 to a bisecting line 105 extending through the apex points 100 and 102.

D = 0.168 inches where D is the distance along the base plane 101 from the bisecting line 105 to the other rim 107.

The angle between the surface 72b and a vertical is 12° while the angle between the surface 72a and a horizontal is 3° The internal angle between a short inner surface 108 and the base plane 101 is 33.2° and the angle between the long inner surface 109 and the base plane is 28.7°. The included angle between the surfaces 108 and 109 is approximately 118°.

Figure 4:
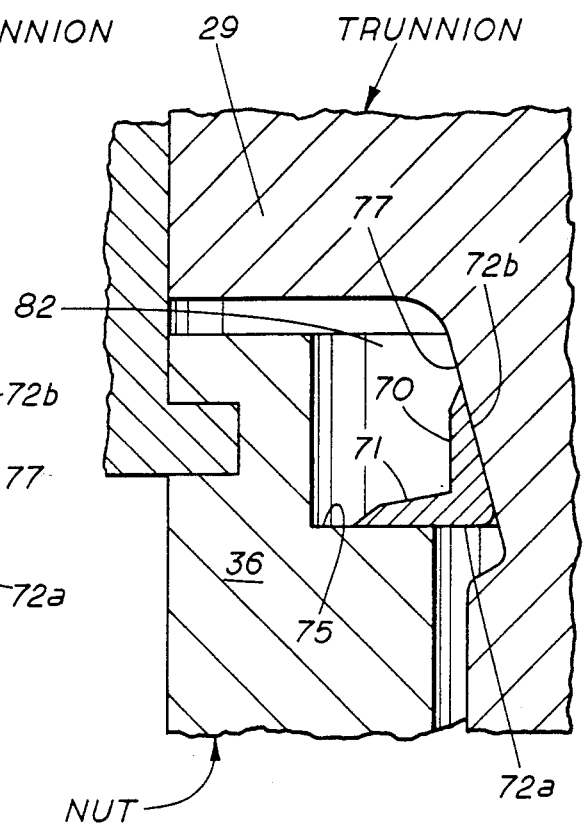
FIG. 4 is a view is partial cross section of the rotative seal ring of FIG. 2 but in a sealing condition.

Referring now to FIG. 4, the sealing means 70 is shown in an energized condition. The energized condition is obtained by relative axial motion between the plug element 29 and the valve body 10 to cause the sealing means 70 to flex from the 85° included angle to the 75° included angle. This flexing induces a metal-to-metal sealing force between the surfaces 72b, 77 and the surfaces 72a, 75.

Fluid pressure in an annular space 82 about the trunnion surface 77 acts upon the inner surface 71 of the sealing means 70 and will not leak so long as the compressive forces of the sealing means maintain the seal. The sealing pressure of the sealing means 70 is a relatively constant factor. It can be appreciated that a lateral shift of the plug element 26 relative to the valve body 10 will shift the surface 72a along the surface 75 of the adjusting nut 36 but will not affect the sealing forces therebetween. The sealing means 70 can be constructed from Inconel 718, for example, and is constructed to be resilient within the degree of movement required for sealing.

Figure 5:
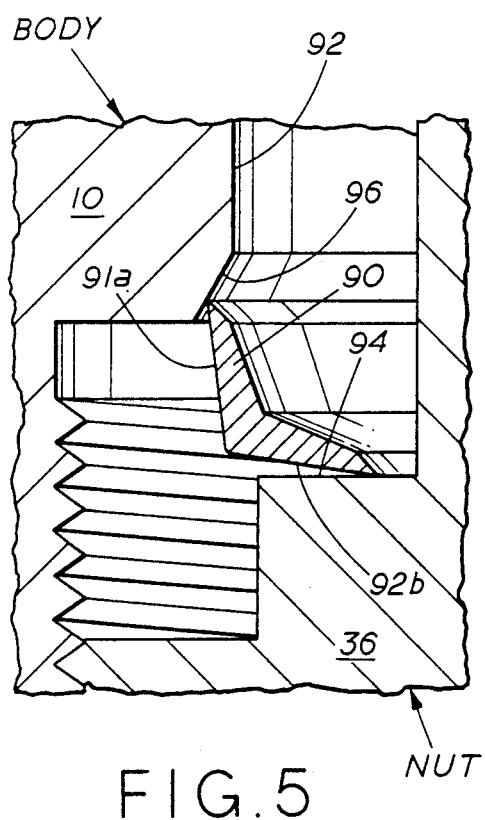
FIG. 5 is a view in partial cross section of a static seal ring shown in initial unsealing condition.
Figure 6:
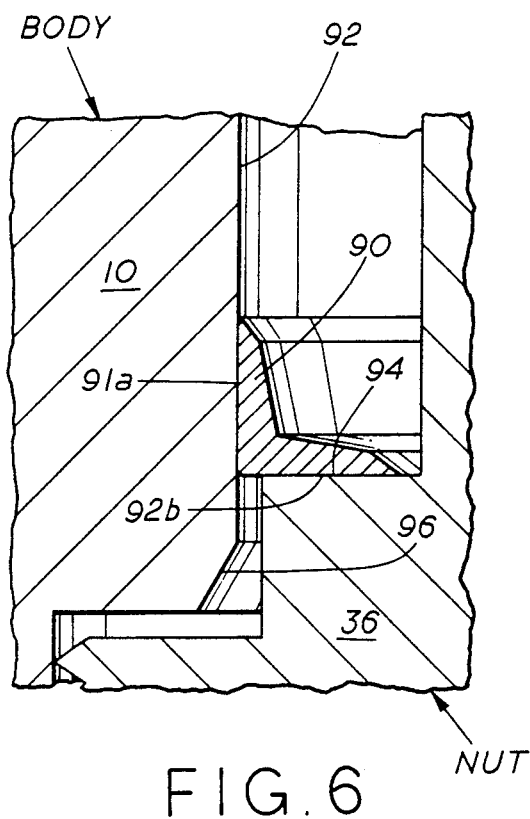
FIG. 6 is a view in partial cross section of the static seal of FIG. 5 in a sealing condition.

Referring now to FIGS. 5 and 6, a sealing ring or sealing means 90 for a static seal (as distinguished from a seal subjected to rotative forces) is illustrated in the unstressed condition (FIG. 5) and a loaded or stressed condition (FIG. 6). The O-ring seal 50 of FIG. 1 can be replaced with a metal sealing ring as will hereinafter be described. As shown in FIG. 5, a static seal is required for the sealing surfaces 92, 94 of the valve body and adjusting nut respectively. The vertically oriented frusto conical surface 92 of the valve body has an adjoining bevel surface 96 adapted for initial engagement with the sealing ring 90. The sealing ring 90 has convergent outer surfaces 91a, 92b which have an included angle of 100°. Thus, when the sealing ring 90 is in an initial unstressed condition, the outer tip or annular edge of the sealing ring engages the beveled surface 96. In this condition, the outer surface 91a is at an angle of about 5° with respect to vertical while the surface 92b is at an angle of about 5° with respect to the annular transverse surface 94. When the valve body 10 and adjusting nut 36 are moved axially relative to one another the edge of the sealing ring 90 rides up the bevel surface 96 of the valve body and is flexed to bring the surface 91a of the sealing ring into contact with the surface 92 and the surface 91b of the sealing ring into contact with the planar annular surface 94 of the adjusting nut. In this condition, the sealing ring 90 is loaded and develops metal-to-metal sealing forces.

Figure 11:
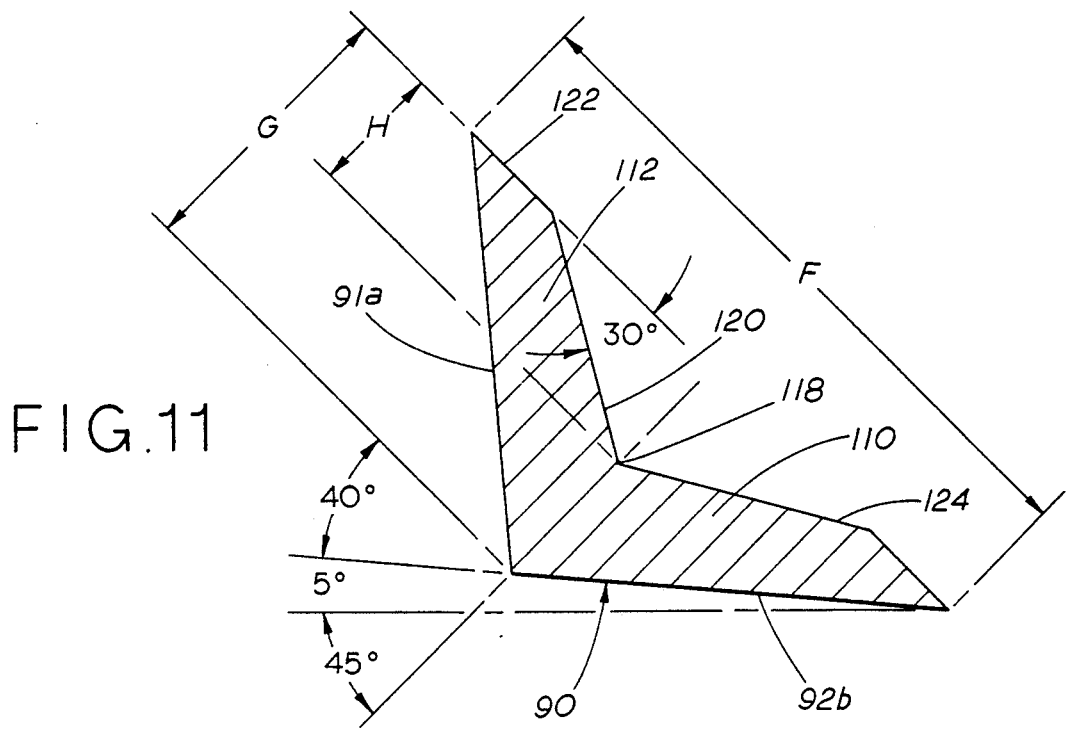
FIG. 11 is an enlarged view in cross section through a static sealing as shown in FIG. 5.

As shown in FIG. 11, the sealing ring 90 has symmetrical wing portions 110 and 112 with respect to a bisecting line 114 where the line 114 extends through an outer apex 116 and an inner apex 118. The angle of the inner surface 120 relative to a base plane 122 is 3°. The angle of a surface 92b to a horizontal is 5°. The included angle between the surfaces 92b and 91a is 110° while the included angle between the surfaces 120 and 124 is 120°. The dimensions for a 2' plug valve are F = 0.418 inches where F is the dimensions along a a base plane 122 from rim to rim.

G = 0.170 inches where G is the dimension from the base plane 122 to the outer apex 116.

H = 0.072 inches where H is the dimension from the base plane 122 to the inner apex 118.

In a plug valve such as shown in FIG. 1, a sealing ring or sealing means 70 can be utilized between the plug element 26 and the adjustment nut 36 to seal off the lower trunnion 29. The lower trunnion is provided with a frusto conical surface 77 while the nut 36 has a transverse annular surface 75. (See FIG. 4). The sealing ring 70 is loaded by attaching the cap screw and plate 38 to the adjustment nut 36. (See FIG. 4 and FIG. 7).

With the valve element 26 and adjustment nut 36 assembled and the inserts 44 in place, this sub-assembly is inserted into the chamber in the valve body with a sealing ring 70 disposed about the upper trunnion 28 and a static sealing means 90 disposed in the sealing space between the adjustment nut 36 and the valve body 10. (See FIG. 8). The adjustment nut 29 is then threaded into the body member to pre-stress the sealing means 70 and 90 (see FIG. 9). The seals provide for an all metal-to-metal seal in a plug valve.

It will be apparent to those skilled in the art that various changes may be made in the invention without departing from the spirit and scope thereof and therefore the invention is not limited by that which is enclosed in the drawings and specifications, but only as indicated in the appended claims.

I claim:

1. A metal to metal dynamic sealing system for pressure sealing a rotatable shaft relative to a housing member comprising:
   a housing member having a cylindrically shaped opening disposed along a first central axis and arranged to be subjected to internal pressure;
   a cylindrically shaped shaft having a second central axis, said shaft being rotatively mounted in said housing member with said first and second central axes in alignment, said shaft being subject to transverse movement relative to said housing member in response to internal pressure to move said first and second central axes out of alignment;
   said sealing system including
   (a) an annular transverse sealing surface on said housing member,
   (b) a frusto-conical sealing surface on said shaft were said frusto-conical sealing surface adjoins a cylindrically shaped surface which defines an annular space with respect to said housing member, and
   (c) an annular resilient metal sealing element having a V-shaped cross section with first and second outer sealing surfaces extending between an apex of the V and the terminal ends of said first and second outer sealing surfaces; said metal sealing element having an included element angle for the first and second outer sealing surfaces which is greater than the included sealing angle between said frusto-conical sealing surface and said transverse sealing surface in an unloaded condition of said sealing element so that said metal sealing element can be disposed between said shaft and said housing member with said terminal ends of said first and second outer sealing surfaces in contact with said transverse sealing surface and said frusto-conical sealing surface and so that the terminal end of said metal element can be resiliently biased inwardly to a loaded sealing condition by relative longitudinal movement between said shaft and said housing member along said first and second central axes to bring said first and second outer sealing surfaces in sealing contact with said transverse sealing surface and said frusto-conical sealing surface and so that the included element angle and said first and second outer sealing surfaces are conformed to the included sealing angle between said frusto-conical sealing surface and said transverse sealing surface;
   said housing member at said transverse sealing surface having a wall surface spaced annularly outward from the terminal end of said outer sealing surface on said transverse sealing surface so that said shaft and said metal sealing element can shift in a direction transverse to its central axis while maintaining the pressure seal of said metal sealing element against said transverse sealing surface an said frusto-conical sealing surface in response to internal pressure.

2. The sealing system as set forth in claim 1 wherein the included sealing angle between said transverse sealing surface and said frusto-conical sealing surface is approximately 75°.

3. The sealing system as set forth in claim 2 wherein the included element angle between said first and second outer surface portions is approximately 85°.

4. The sealing system as set forth in claim 1 wherein said shaft includes a first trunnion portion and a second trunnion portion with an intermediate valve element, said first and second trunnion portions being rotatively disposed in said housing member, and a second sealing system for said second trunnion portion, each of said sealing systems having a transverse sealing surface and a frusto-conical sealing surface for a trunnion portion disposed at an angle of approximately 75° relative to one another.

5. The sealing system as set forth in claim 4 where in the included element angle between said first and second outer sealing surfaces of a metal sealing element is approximately 85°.

6. The sealing system as set forth in claim 4 wherein one of said trunnions portions is attached to an adjustment nut and where said adjustment nut attaches to said housing member, a sealing recess located between said adjustment nut and said housing member, said sealing recess having a recess sealing surface disposed at a sealing angle of 90° with respect to a sealing wall surface on said adjustment nut, and an annular resilient metal recess sealing element having a V shaped cross section disposed in said recess where the included angle of outer sealing surfaces on said recess sealing element is grater than the included sealing angle between the recess sealing surface and said sealing wall surface so that said recess sealing element can be disposed in said sealing recess and resiliently based to conform the included angle of the outer sealing surfaces to the sealing angle of 90° thereby to effect a metal-to-metal seal.

7. The sealing system as set forth in claim 6 wherein said sealing wall has a beveled entry section for initial contact with the end of said recess sealing element.

8. The sealing system as set forth in claim 1 wherein said metal sealing element has non-symmetrical wing portions in cross section forming said V shaped cross section.

9. The sealing system as set forth in claim 8 wherein one said outer sealing surface is at an angle of 89° relative to a vertical line parallel to a central axis while the other of said outer sealing surface is at an angle of 3° from a perpendicular line to a central axis.

10. The sealing system as set forth in claim 9 wherein said one outer sealing surface has a greater length than the length of said other outer sealing surface.

11. A metal-to-metal sealing system for pressure sealing a cylindrical member relative to a housing member comprising:
    a housing member having a cylindrically shaped opening along a first central axis and arranged to be subjected to internal pressure, said opening having first and second bore portions to define a first shoulder, the smaller of said bore portions having a frusto-conical surface extending between the first shoulder and the smaller bore portion;
    a cylindrically shaped member having a second central axis, said member being receivable in said opening in said housing member with said first and second central axis in alignment, said cylindrically shaped member having a transverse sealing surface formed between first and second diametrical portions of said cylindrically shaped member, the smaller diametrical portion of said first and second diametrical portions being sized for reception in the smaller bore portion of said first and second bore portions and define an annular space therebetween;

said sealing system including a cylindrical sealing surface in said smaller bore portion located adjacent to said frusto-conical surface;

an annular resilient metal sealing element having a V-shaped cross section with first and second outer sealing surfaces extending between an apex of the V and the terminal ends of said first and second outer sealing surfaces; said metal sealing element having an included element angle between the first and second outer sealing surfaces which is grater than the included sealing angle between said cylindrical sealing surface and said transverse sealing surface is an unloaded condition so that said metal sealing element can be disposed between said cylindrically shaped member and said housing member with said terminal ends of said first and second outer sealing surfaces in contact with said transverse sealing surface and said frusto-conical surface and so that the terminal ends of said metal sealing element can be resiliently based inwardly to a loaded sealing condition by relative longitudinal movement between said cylindrical member and said housing member along said first and second axis to bring said first and second outer sealing surfaces in sealing contact with said transverse sealing surface and said cylindrical sealing surface so that the included element angle and said first and second outer sealing surfaces are conformed to the included sealing angle between said cylindrical surface and said transverse sealing surface; and said cylindrical member at said transverse sealing surface having a wall surface spaced annularly outward from the terminal end of said sealing surface on said transverse sealing surface.

12. The sealing system as set forth in claim 11 wherein said metal sealing element has symmetrical wing portions in cross section forming said V shaped cross section.

* * * * *